United States Patent
Goldsweer et al.

(10) Patent No.: US 6,186,476 B1
(45) Date of Patent: Feb. 13, 2001

(54) SHUT-OFF VALVE FOR PIPES

(75) Inventors: Karl Wilhelm Goldsweer, Weenermoorer Strasse 133, 26826 Weener/Ems (DE); Mario Enrico Brueggemann, Weener/Ems (DE)

(73) Assignee: Karl Wilhelm Goldsweer, Weener/Ems (DE)

( * ) Notice: Under 35 U.S.C. 154(b), the term of this patent shall be extended for 0 days.

(21) Appl. No.: 09/341,793
(22) PCT Filed: Jan. 14, 1998
(86) PCT No.: PCT/EP98/00182
§ 371 Date: Jul. 16, 1999
§ 102(e) Date: Jul. 16, 1999
(87) PCT Pub. No.: WO98/31956
PCT Pub. Date: Jul. 23, 1998

(30) Foreign Application Priority Data

Jan. 16, 1997 (DE) .............................. 197 01 213

(51) Int. Cl.⁷ ...................................... F16K 5/06
(52) U.S. Cl. ...................... 251/315.13; 251/317
(58) Field of Search ............ 251/315.13, 315.15, 251/315.1, 315.01, 314, 316, 317; 137/375

(56) References Cited

U.S. PATENT DOCUMENTS

| | | | |
|---|---|---|---|
| 3,056,576 | * | 10/1962 | Kulisek ........................ 251/315.13 |
| 3,227,174 | * | 1/1966 | Yost ............................ 251/315.13 |
| 3,244,398 | * | 4/1966 | Scarmamucci ............... 251/315.13 |
| 3,334,650 | * | 8/1967 | Lowery et al. ............... 251/315.13 |
| 3,336,938 | * | 8/1967 | Schenck, Jr. ................. 251/315.15 |
| 3,367,359 | * | 2/1968 | Johnson ....................... 251/315.13 |
| 4,696,323 | * | 9/1987 | Iff .................................. 251/315.13 |

FOREIGN PATENT DOCUMENTS

| | | |
|---|---|---|
| 17 95 531 | 9/1959 | (DE) . |
| 18 04 604 | 5/1970 | (DE) . |
| 44 09 796 | 6/1995 | (DE) . |
| 44 14 716 | 7/1995 | (DE) . |
| 1 293 381 | 10/1972 | (GB) . |

* cited by examiner

Primary Examiner—Kevin Shaver
Assistant Examiner—Eric Keasel
(74) Attorney, Agent, or Firm—Browdy and Neimark

(57) ABSTRACT

The invention relates to a shut-off valve 1 for pipelines and/or for tanks that hold liquids. The shut-off valve 1 has two-part valve housing 3 with a passage opening 4. In the passage opening 4, there is likewise a sliding and/or rotatably supported, spherical closure element 5 that likewise has a passage opening 4'. The closure element 5 is surrounded by two half-shell shaped sealing shells 6, 7. The sealing shells 6, 7 form a passage opening 4" that corresponds to the passage opening 4' of the closure element 5 and consist of a softer or more elastic material in comparison to the closure element 5. Each of the sealing shells 6, 7, at least on their opposite faces 8, has a ring-shaped device 9, 9' for purposes of securing between the housing halves, the valve housing 3, 3' or between the flange 28 of the valve housing 3, 3'. This device or the two ring-shaped flanges 9, 9' can be inserted into a recess 16 of the valve housing 3, 3' and are held together directly or indirectly by the valve housing 3, 3'.

10 Claims, 6 Drawing Sheets

SHUT-OFF VALVE FOR PIPES

BACKGROUND OF THE INVENTION

The invention relates to a shut-off valve for pipelines and/or for tanks that hold liquids.

A shut-off valve for pipelines and for tanks that hold liquids is already known which is fitted with a closure element and with a passage borehole positioned crosswise to the axis of oscillation of the closure element for purposes of opening and closing the entire free flow area (DE 44 09 796). At the height of the flow area, crosswise to the longitudinal axis, the closure element is configured free of material towards one side. The remaining outer wall of the closure element facing the opposite side forms the sealing surface area of the free flow area along the flow axis. The spherical closure element is completely surrounded by two sealing half shells, except for the flow area. The closure element is supported in these half shells in such a way that it can slide and rotate. The two closure elements are held together by the divided housing and by appropriate screws.

BRIEF SUMMARY OF THE INVENTION

The invention has the objective of creating a shut-off valve of the type described above and configuring it so as to ensure flawless sealing, even when cleaning liquids are used, which can have a very high temperature, or when sterile steam is employed.

This objective is achieved by the provision of a shut-off valve for pipelines and/or for tanks that hold liquids, whereby the shut-off valve has a two-part valve housing with a passage opening in which there is likewise a sliding and/or rotatably supported spherical closure element that has a passage opening and that is surrounded by two half-shell shaped sealing shells that form a passage opening that corresponds to the passage opening of the closure element. The sealing shells consist of a softer or more elastic material in comparison to the closure element. According to a primary feature of the invention, the sealing shells have an insert that is configured as a support element and that extends into the area of a first flange of the sealing shells and/or of the passage opening and the insert or support element projects from the sealing shells and forms a second flange that is associated with the first flange. Other feature of the invention will be described below. The As a result of the advantageous configuration of the shut-off valve and of the two sealing shells that are connected to each other, the sealing effect by means of the closure element is considerably improved and, at the same time, it is ensured that, even when the shut-off valve has been in operation for extended periods, it can be cleaned within a very short time without this impairing the quality of the closure device. Since at least the sealing shells are provided with an element or with a flange part that can be inserted into a recess of the valve housing, the two sealing shells can easily be pressed against the surface of the closure element as well as against the inner surface of the valve housing, thus achieving an excellent sealing effect between the closure element and the valve housing with just a few components.

A considerable improvement is achieved in that the sealing shells are fitted with an insert that can be made, for instance, of metal or of a steel alloy. This insert can be shaped like a shell and can be approximately fitted to the spherical inner surface of the sealing shell.

The insert can be designed as a support element while the sealing shell can be designed as an arched segment and can then be placed with one part into the area of one of the flanges provided on the sealing shell or into the edge area. It is also possible for the flange provided on the sealing shell to be of the same size and length as the flange provided on the support element. The two flange parts can either lie against each other loosely or else they can be firmly attached to each other.

For this purpose, it is advantageous for the sealing shell to likewise be made of an elastic or elastomeric material, so that it is readily fitted to the outer contour of the closure element or to the inner surface of the seat of the sealing shell. By using the support element, the closure element can withstand extreme stresses as well as high flow rates without the closure element being subsequently deformed or pulled out of its seat.

In order to attain sufficient pretensioning, it is advantageous for the inner diameter of both sealing shells—when they are joined—to be somewhat smaller than the outer diameter of the seat of the closure element. In this manner, sufficient surface pressure is achieved between the closure element and the sealing shells when they are assembled. By the same token, it is also possible for the width of the two flanges of the sealing shell—when they are joined—to be somewhat larger than the recess in the valve housing. This brings about the necessary pretensioning and surface pressure between the sealing element and the sealing shells when the valve housing is joined by means of the appropriate connecting screws.

An additional improvement can be achieved in that locking rings or O-rings are placed into corresponding recesses in the sealing shells and said rings additionally press the sealing shells against the surface of the sealing element.

In an advantageous manner, the sealing rings can be configured so as to be springy. Moreover, they can be designed as continuous or one-piece rings or else as split rings and can be made of a non-stick material, for example, of PTFE sold under the trademark TEFLON® or acetal, sold under the trademark DELRIN®. By the same token, the sealing shells can also be made of this material. As a result, the sliding capacity between the sealing element and the sealing shells is greatly improved. In addition, the surface of the sealing shell or the surface of the seat of the sealing shell in the valve housing can be provided with an appropriate lubricant and thus can ensure flawless, smooth turning of the closure element in the valve housing, but without impairing the sealing ability.

Furthermore, it is also possible to design the sealing shells without support elements whereby, in order to avoid a deformation of the sealing shells at high stress levels, the sealing shells are then made of a harder material than what is used for sealing shells with support elements. The sealing shells can be made of an elastomeric or rubber-like material. For this purpose, it is advantageous if the support element is vulcanized into the sealing shells or permanently integrated into the sealing shells.

Additional advantages and details of the invention are explained in the patent claims and in the description and illustrated in the figures. The following is shown:

DETAILED DESCRIPTION OF THE INVENTION

Figure 1:
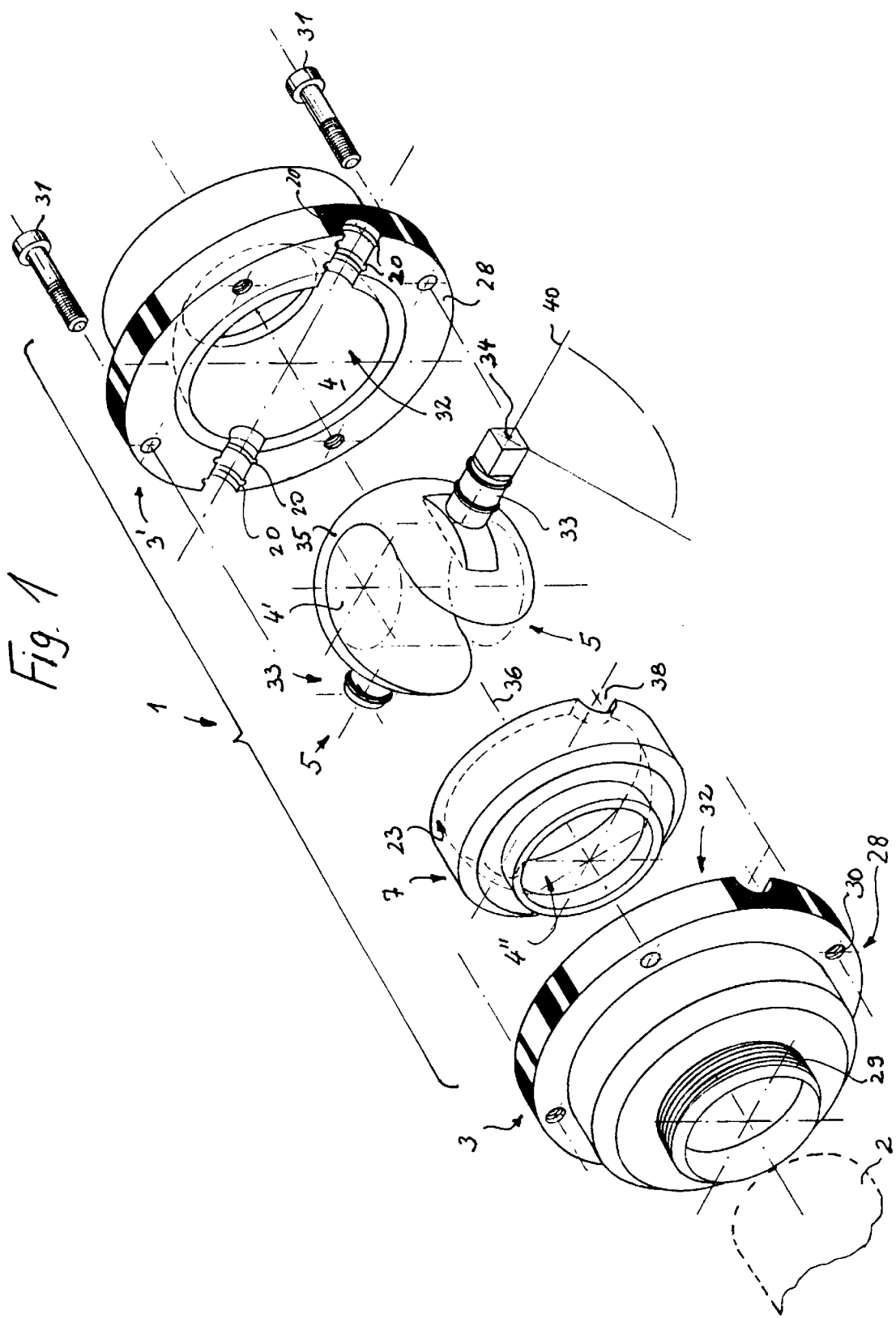
FIG. 1 an exploded view of the shut-off valve.
Figure 5:
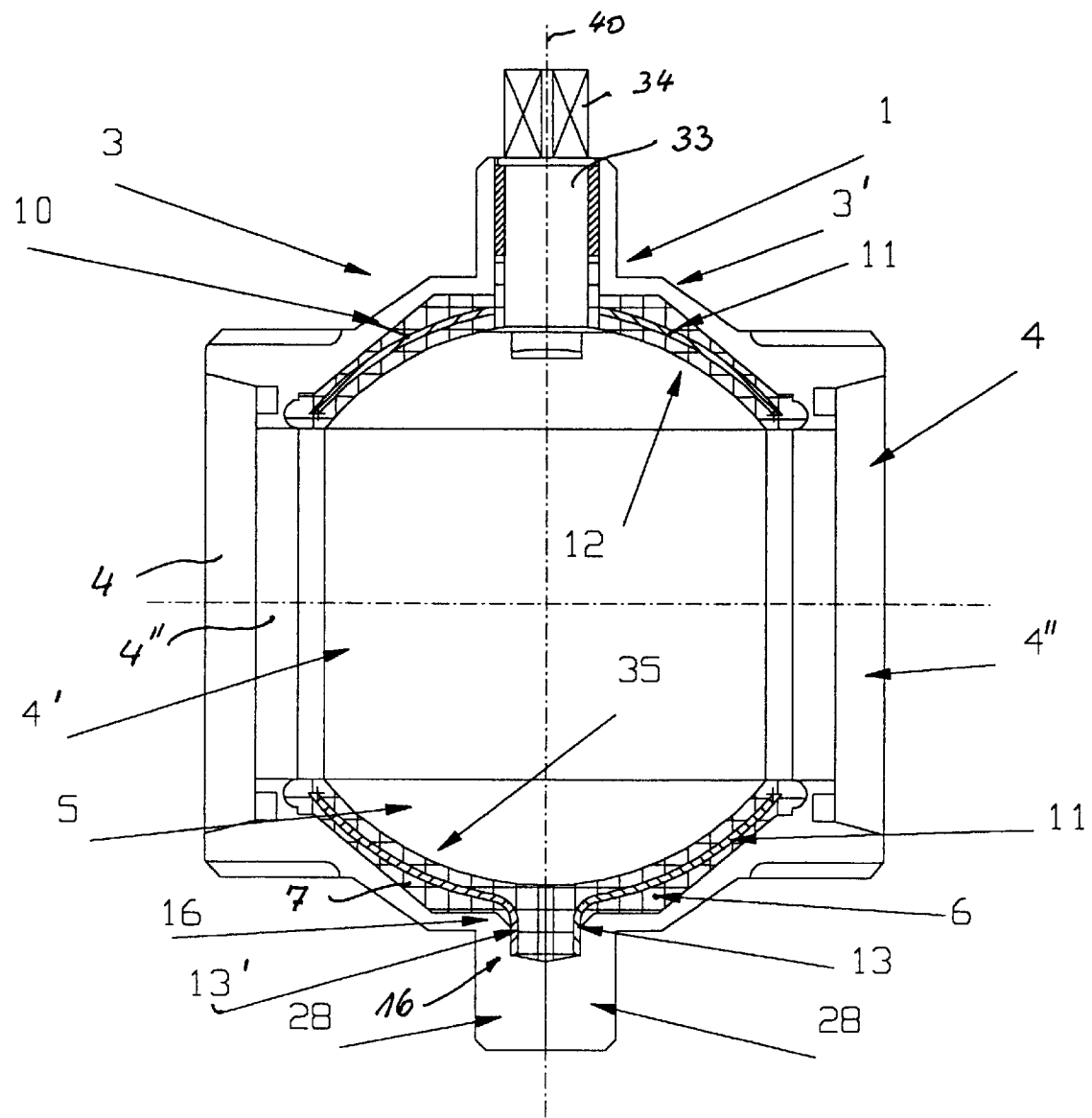

In FIG. 1 of the drawing, reference numeral 1 designates the shut-off valve that consists of a two-part valve housing 3, 3'. Each half of the valve housing, 3, 3' has a flange 28 with a threaded adapter 29 for connecting a pipeline 2. The flange 28 is provided with numerous boreholes 30 for receiving screw bolts 31 by means of which the two halves of the valve housing 3, 3' shown in FIG. 5 are secured or held together.

Figure 4:
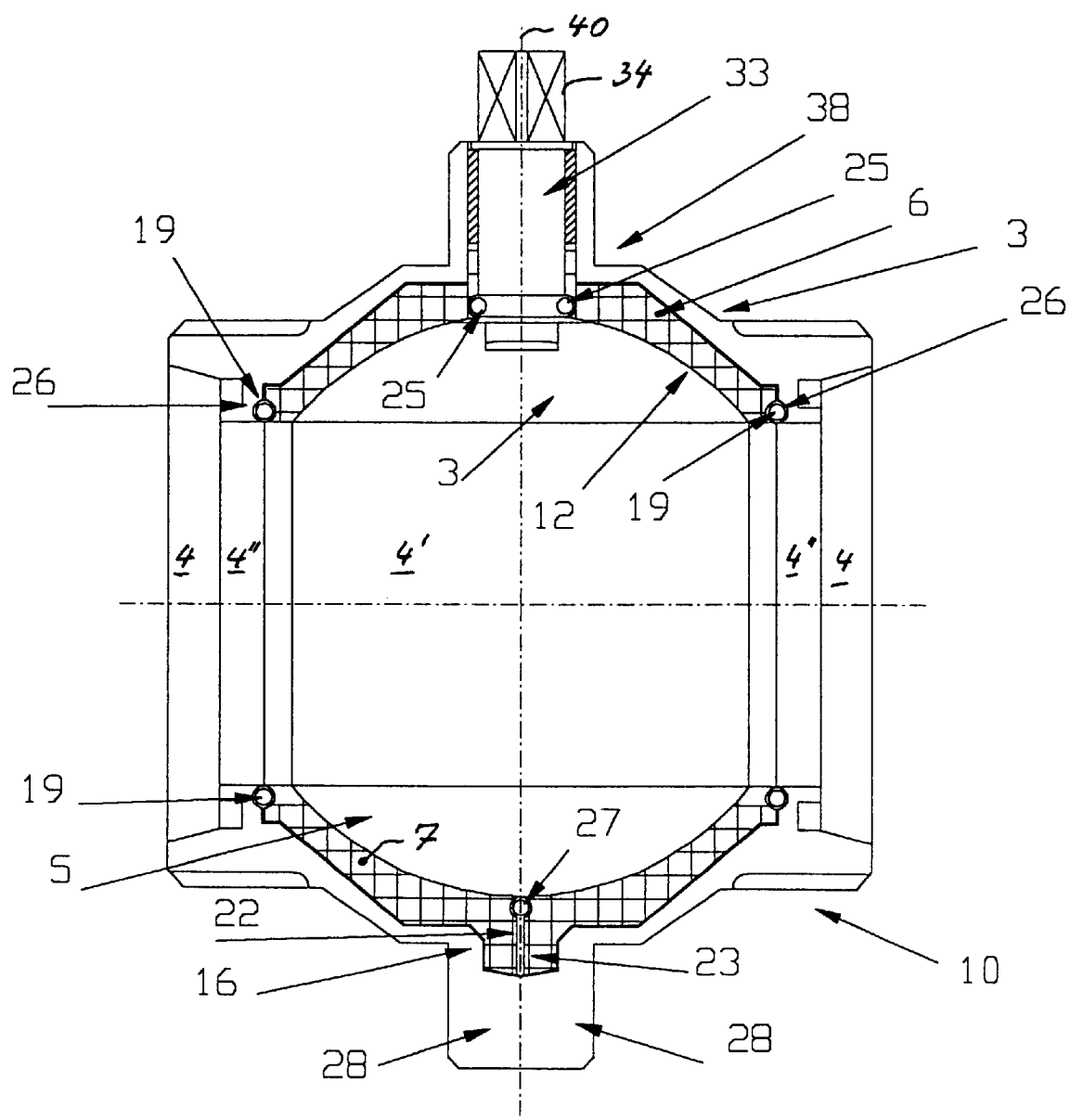
FIG. 4 cross section of the shut-off valve with the two opposite sealing shells and the sliding or rotatably supported closure element in a flow position, FIG. 5 another embodiment of the shut-off valve in the same representation as in FIG. 4, but with a support element provided in the sealing shells.

The valve housing 3, 3' or the two halves of the valve housing are each provided with a valve seat 32 into which a closure element 5 can be inserted. The closure element 5 is spherical in shape and has a passage opening 4' whose flow area corresponds approximately to a passage opening 4" of two sealing shells 6, 7 and a passage opening 4 of the valve housing 3 or 3'. As can be seen in FIGS. 4 and 5, the passage opening 4' of the closure element 5 can have the exact same cross section as the passage opening 4" of the sealing shells 6, 7.

The closure element 5 can be rotated by 90° around a rotational axis 40. For this purpose, the surface of said closure element 5 has two swivel pins 33 that lie on the axis 40. One of these swivel pins 33 is provided with a square end 34. By using a wrench on the square end 34, the closure element 5 can be rotated around the axis 40 in such a way that its passage opening 4' is aligned coaxially with the passage opening 4 of the valve housing 3 and with the passage opening 4" of the sealing shells 6 and 7.

At the height of the flow area, crosswise to the longitudinal axis 40, the closure element 5 is configured free of material towards one side, whereby only a remaining outer wall 35 of the closure element 5 facing the opposite side forms the sealing surface area of the free flow area along a flow axis 36.

As shown in FIGS. 4 and 5, the two sealing shells 6 and 7 that are aligned coaxially with the flow axis 36 completely surround the surface of the closure element 5 and thus also serve as valve seat 32 for the sealing element 5.

For the sake of simplicity, FIG. 1 only shows the left-hand sealing shell 7 without the flange 9. A second sealing shell 6 as shown in FIGS. 4 and 5 would be located between the closure element 5 and the right-hand half of the valve housing 3'. Both sealing shells or sealing half shells 6, 7 are brought into contact with each other in the assembled state shown in FIGS. 4 and 5 and, in this manner, they completely surround the closure element 5.

The sealing shells or sealing half shells 6, 7 can be accommodated in the valve housings 3, 3' if the flanges 28 of the housing halves 3, 3' are brought into contact with each other. In order to ensure an adequate surface pressure between the surface of the outer wall 35 of the closure element 5 and the seat 32 in the valve housing 3, each of the half shells 6, 7 shown in FIGS. 2 through 5 is provided with an appropriate flange 9, 9' that is ring-shaped and is only interrupted by an opening 38 that serves to hold the two swivel pins 33. The outer diameter or the dimensions of the flanges 9, 9' is larger than the outer diameter of the half shells 6, 7. When they are assembled, the two flanges of the two half shells 6, 7 are brought into contact and inserted into a recess 16 provided in the valve housing 3, 3'. In an advantageous manner, the total width 18 of the two flanges 9, 9' before the assembly is somewhat larger than the width of the recess 16 of the joined valve housing 3, 3'. Furthermore, the outer diameter of the spherical valve closure element 5 can likewise be somewhat larger than the inner diameter 17 of the seat 32 in the valve housing 3, 3', so that this ensures an appropriate pretensioning when the valve housing 3, 3' is joined with the half shells 6, 7.

Figure 2:
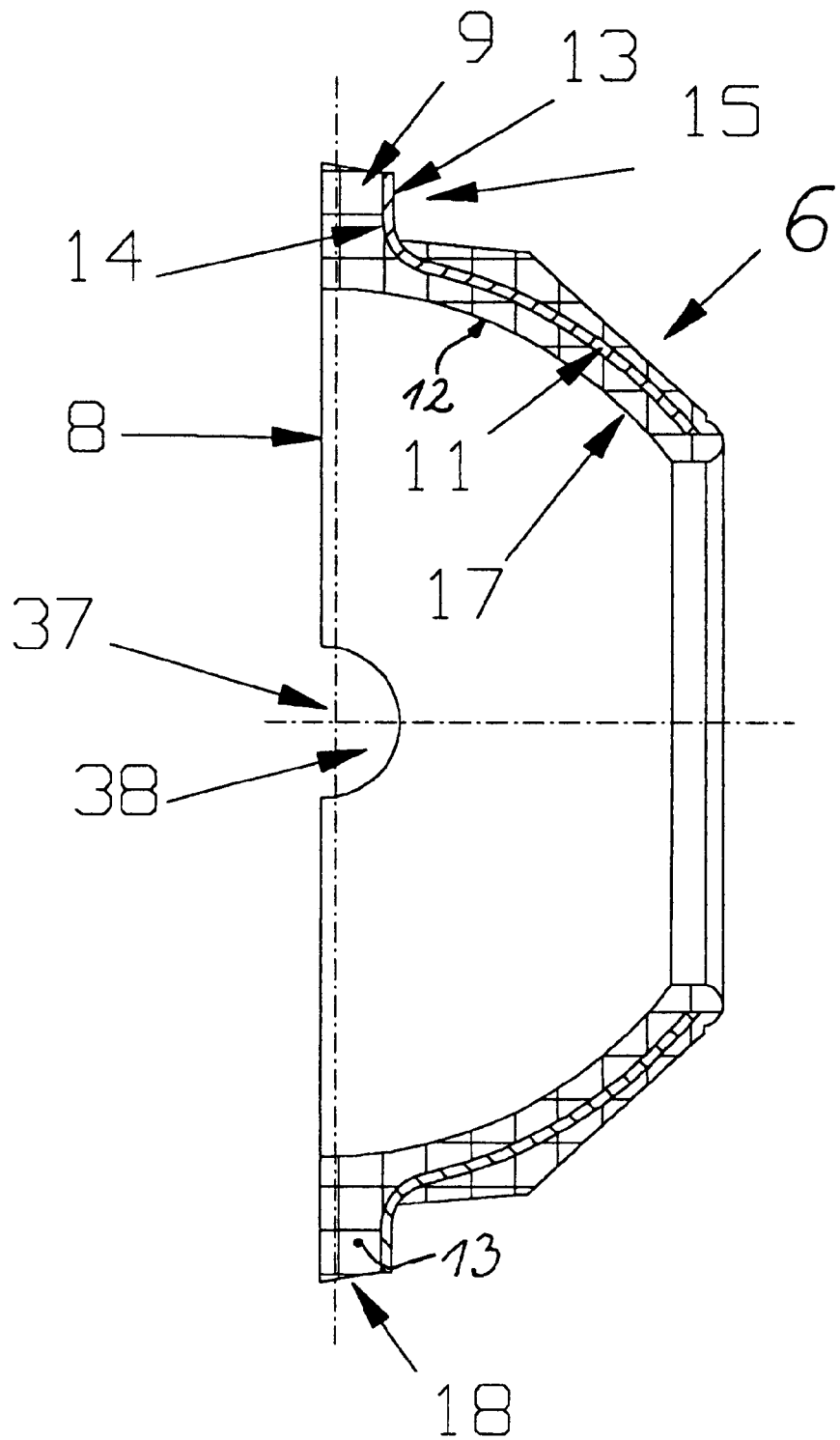
FIG. 2 one half of a sealing shell with a support element.
Figure 3:
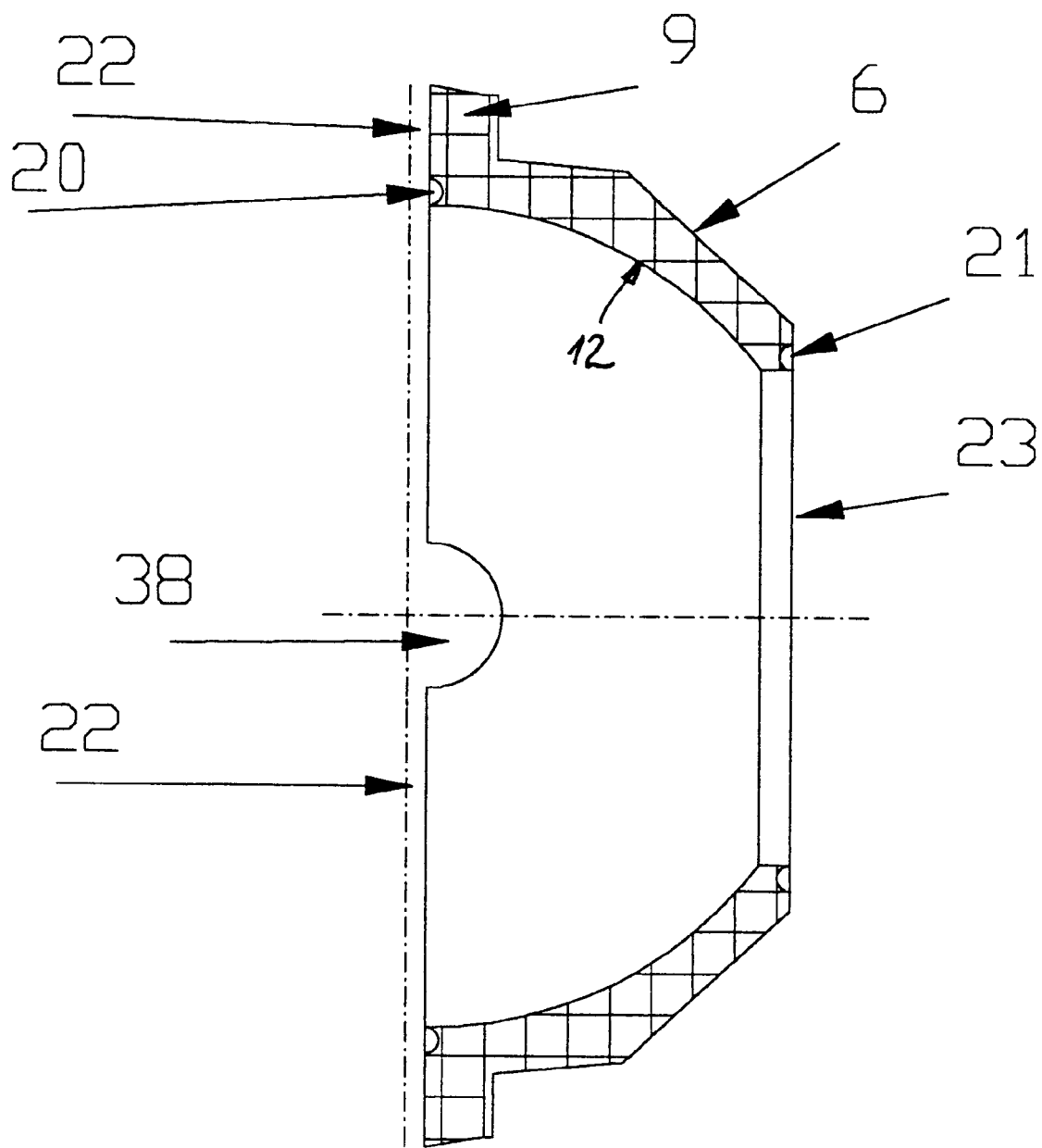
FIG. 3 another embodiment of a sealing shell, but without a support element.

Inserts 10 and 11 shown in FIGS. 2 and 5 configured as support elements have been left out in the embodiment shown in FIGS. 1 and 3. In this case, the sealing shell 6 is made of a much harder or stronger material than what is used for the sealing shell 7 in the embodiment shown in FIGS. 2 and 5. As a result, a very precise fit of the inner surface 12 relative to the outer surface or outer wall 35 of the closure element 5 has to be ensured in order to achieve flawless sealing. In this case as well, the elasticity of the sealing shells 6 and 7 is greater than the elasticity of the closure element 5. In the embodiments shown in FIG. 2, each of the support elements 10, 11 of the sealing shells 6 and 7 has a flange 13 or 13' with a surface 14. Shown in FIG. 1, the face 23 of the sealing shell 7, like the face 22 of the sealing shell 6, is configured flat so that they lie against each other precisely when they are assembled, thus completely surrounding the closure element 5. The flange parts 13, 13' of the sealing shells 6 and 7 can be inserted into the recess 16 provided in the valve housing so that, by pressing the two housing halves 3 and 3' of the valve housing together, a high surface pressure is ensured as a result of the pretensioning between the inner surface 12 of the sealing shells 6 and 7 and the outer wall 35 of the closure element 5.

The sealing effect between the sealing shells 6 and 7 and the closure element 5 can be improved in that O-rings 19, 25 and 26, 27 are used. The O-ring 19 can be configured as a springy one-piece or split ring. The O-ring 19 is located in an appropriate recess 20 that is provided partially in the sealing shell 6 and partially in the oppositely situated sealing shell 7. By means of the O-ring 19, the surface pressure between the inner surface 12 of the two sealing shells 6 and 7 and the outer wall 35 of the sealing element 5 is further improved. The grooves or recesses 20 serve to receive an O-ring 26 in a way similar to recess 21 on the face 23 of the half shell 7. Thus, one half of the recess 21 is in the half shell 6 and the other in the housing half 3 of the valve housing. Consequently, the O-rings 19 and 26 press the sealing shells 6, 7 against the surface of the closure element 5.

In order to ensure flawless sealing of the borehole 38 in the valve housing 3 or in the borehole of the closure element 5, the turning pin of the swivel pin or of the control shaft 33 is sealed by one or more O-ring gaskets or by the O-ring 25 that is positioned on the swivel pin 33 for this purpose and part of which extends into the sealing shells 6 and 7.

The O-rings 19, 26, which can be configured as spring rings, can be made, for example, of, PTFE or acetal. The material of the closure element 5, as already mentioned, can be made of an elastomeric material such as rubber. Likewise, it is possible to make the closure element 5 of a harder material, for example, PTFE. In order to ensure smooth turning of the closure element 5 in the valve housing 3, 3', the surfaces of the closure element 5 and the inner surface of the sealing shells 6 and 7 are provided with a lubricant layer or are coated with PTFE.

In FIG. 1, the assembly of the shut-off valve can readily be recognized. First of all, the closure element 5 is placed into the valve seat 32 of the sealing shells 6 and 7 that are to be joined, whereby then the swivel pin 33 is inserted into the appropriate borehole 38 of the valve housing 3. Subsequently, the two sealing shells 6 and 7 are placed in contact against each other with their flanges 9 and/or 13. Before that, the O-rings 19 or 25 and 26 must have been placed into the appropriate recesses 20 and 21. Then the two sealing shells 6 and 7 can be completely joined and subsequently the housing halves 3, 3' of the valve housing can be secured by means of screw bolts 31. Due to the above-mentioned pretensioning, the desired sealing effect is achieved. For this purpose, the screw bolts 31, as already mentioned, have to be inserted into the boreholes 30 of the flange 28 and screwed together. Now the desired surface pressure between the inner surface 12 of the sealing shells 6 and 7 and the outer wall 35 of the closure element 5 has been achieved and so has a very precise sealing effect that will still withstand the stress, even if high flow rates occur or if flowing media at very high temperatures are used.

The closure element 5 can now be adjusted by moving the control shaft 33 out of the position shown in FIGS. 4 and 5 (flow position) into a position as shown in FIG. 1 (blocked position).

Moreover, it is possible to place rubber-elastic spring rings in the form of the above-mentioned O-rings on the faces of the sealing shells 6 and 7, whereby said rings can be inserted into the appropriate recesses 20. By using a rubber-elastic spring ring, the necessary contact pressure between the sealing element 5 and the sealing shells 6 and 7 is achieved in an advantageous manner.

By using, PTFE or acetal for the sealing material or for the sealing shells 6 and 7, especially in the edge area of the sealing half shells, in conjunction with the measures already described, the sealing effect of the shut-off valve is substantially improved, whereby a very good sealing effect is ensured, even during sterilization at very high working pressures, for example, using steam and hot liquids.

In order to make a compact unit for the sealing shells 6 and 7 with the closure element 5 contained therein, the two sealing shells can also be permanently attached to each other by means of an elastomeric adhesive.

Figure 6:
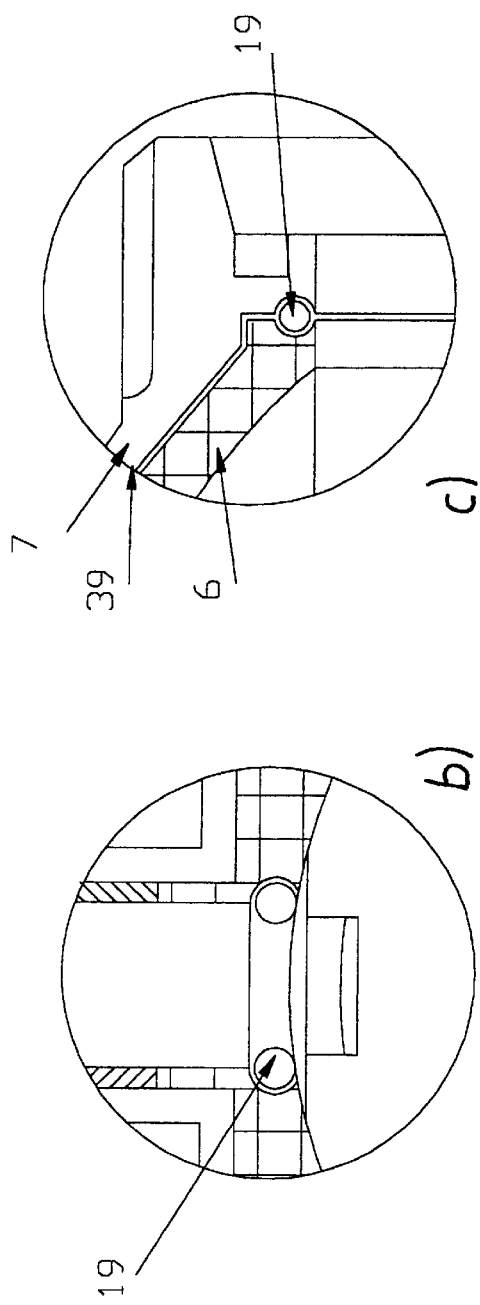
FIG. 6a, 6b and 6c show various embodiments for receiving an O-ring seal in the individual sealing half shells.
Figure 6:
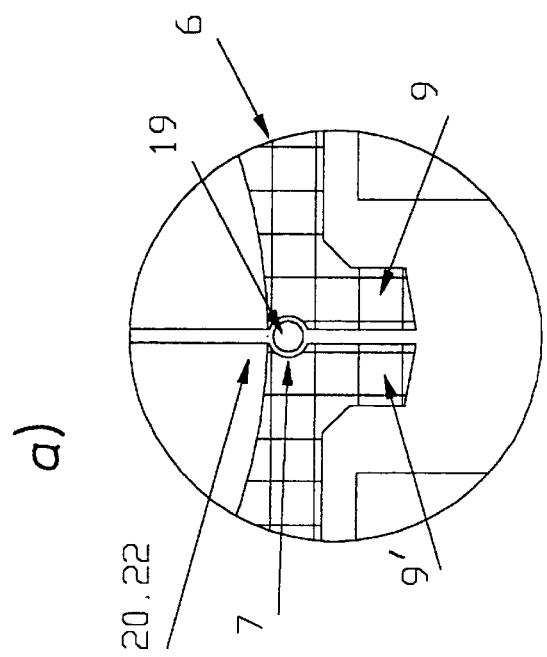

FIGS. 6a through 6c show various embodiments for receiving the O-rings 19 in the sealing shells 6 and 7.

In FIG. 6c, for example, the sealing shell 7 is pulled over the cylindrical body of the sealing shell 6 by means of a lug or a ring flange 39.

What is claimed is:

1. A shut-off valve (1) for pipelines (2) and/or for tanks that hold liquids, said valve comprising:

a valve housing (3) composed of two parts and having a passage opening (4);

a spherical closure element (5) movably installed in said valve housing and having a first passage opening (4'); and two half-shell shaped sealing shells (6, 7) installed in said valve housing and surrounding said spherical closure element, said sealing shells forming a second passage opening (4") that corresponds to the first passage opening (4') of the closure element (5), wherein the sealing shells (6, 7) consist of a material which is softer or more elastic than the material of the closure element (5), each of the sealing shells has a flange (9) and an insert that is configured as a support element and that extends into the area of the flange (9) of the sealing shell, and the inserts project from the sealing shells (6, 7) and form a flange part (13, 13') that is associated with the flange (9).

2. Shut-off valve according to claim 1, wherein the sealing shells have a spherical inner surface (12) and the inserts (11) are made of steel or a steel alloy and are shell-shaped and/or approximately correspond to the spherical inner surface (12) of the sealing shell (6,7).

3. Shut-off valve according to claim 1, wherein each flange part has a first surface (14) which is in contact with a respective sealing shell (6, 7) and a second surface (15) in contact with one side of a recess (16) provided in the valve housing.

4. Shut-off valve according to claim 1, wherein the inner diameter (17) of the two sealing shells (6, 7)—when the two sealing shells are joined together and the closure element (5) is not installed in said housing—is smaller than the outer diameter of the closure element (5).

5. Shut-off valve according to claim 1, wherein the width (18) of the two adjacent flanges (9) of the sealing shell (6, 7)—when the sealing shells are not assembled together—is larger than the width of the recess (16) when the valve housing (3) is assembled.

6. Shut-off valve according to claim 1, wherein the sealing shells (6, 7) and/or the closure element (5) have at least one recess (20) for receiving a split or axially halved O-ring (25) in the area of a control shaft (24) for adjusting the closure element (5).

7. Shut-off valve according to claim 1, wherein the sealing shells (6, 7) have at least one ring-shaped recess (20) with a semicircular cross section to receive at least one locking ring or O-ring (19), whereby said recess (20) is provided in the area of at least one face (22, 23) of the sealing shell (6, 7).

8. Shut-off valve according to claim 7, wherein the at least one O-ring (25, 26, 27) is configured as a spring ring.

9. Shut-off valve according to claim 7, wherein the at least one O-ring (25, 26) and/or the sealing shells (6, 7) are made of PTFE or acetal or of another elastic material.

10. Shut-off valve according to claim 7, wherein the closure element (5) and the sealing shells (6, 7) have surfaces that are in contact with each other and at least a part of those surfaces and/or the at least one O-ring (19) have a lubricant layer or a coating of PTFE.

* * * * *